United States Patent
Howe

(10) Patent No.: US 8,681,223 B2
(45) Date of Patent: Mar. 25, 2014

(54) VIDEO MOTION DETECTION, ANALYSIS AND THREAT DETECTION DEVICE AND METHOD

(75) Inventor: Steven J. Howe, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 385 days.

(21) Appl. No.: 13/168,198

(22) Filed: Jun. 24, 2011

(65) Prior Publication Data

US 2012/0327241 A1    Dec. 27, 2012

(51) Int. Cl.
- H04N 7/18 (2006.01)
- G09G 5/00 (2006.01)
- G06K 9/00 (2006.01)
- G06K 9/62 (2006.01)

(52) U.S. Cl.
USPC ............ 348/155; 345/156; 382/103; 382/224

(58) Field of Classification Search
USPC ..................... 348/155; 345/156; 382/103, 224
See application file for complete search history.

(56) References Cited

U.S. PATENT DOCUMENTS

2006/0045354 A1 *  3/2006  Hanna et al. .................. 382/224

* cited by examiner

*Primary Examiner* — David Czekaj
*Assistant Examiner* — Tsion B Owens
(74) *Attorney, Agent, or Firm* — Husch Blackwell LLP

(57) ABSTRACT

A method and apparatus including a camera collecting video images of a secured area, extracting objects; for each extracted object determining an object size, correcting the object size, for each extracted object determining, an object size, an object aspect ratio, an object speed and object motion path track, comparing the distance corrected object size with a statistical bell curve tuned to nominal human size, comparing aspect ratio to a statistical bell curve tuned to nominal aspect ratio of human proportions, comparing object speed to a statistical bell curve tuned to nominal travel speed of a typical human and comparing object motion path track against ramp function of absolute distance traveled over time, determining a respective threat probability for each of the extracted object signatures based upon the corrected object size, summing the respective threat probabilities and generating an motion alert upon detecting the summed threat probabilities exceeding a threshold value.

22 Claims, 4 Drawing Sheets

VIDEO MOTION DETECTION, ANALYSIS AND THREAT DETECTION DEVICE AND METHOD

FIELD

The field relates to security systems and more particularly to methods of detecting human motion in secured areas.

BACKGROUND

Security systems are generally known. Such systems are typically used to protect a physical space (e.g., a building, a complex of buildings and surrounding spaces, etc.) from intruders.

Intrusion into the protected spaces is often prevented through the use of some form of physical barrier (e.g., walls, fences, etc.) with one or more access points (e.g., doors, windows, etc.). Sensors may be located proximate these access points to detect intruders.

For example, in the case of a door, a perimeter sensor, such as a switch, may be used to detect the opening of such doors. The switch, in turn, may be coupled to an alarm panel through which the security system may be armed and disarmed.

While simple switches may be effective in the case of a building having few doors and windows, they are not cost or labor efficient when securing a multitude of windows or doors. Secondly, switches should not be used as the only line of defense as they can be covertly disabled at the perimeter. In such cases, a motion sensor is needed that covers the broad secured area.

The current practice of motion sensors typically employ Passive Infrared (PIR) technology which detect human body (and unwanted animal) heat against a background and Doppler Microwave (DW) technology which detect changes of returned radio waves as they bounce off a moving object(s).

Known deficiencies of PIR and DW motion sensors include: poor ability to discriminate between small animals (pets or pests) and human intruders; covert thermal cloaking or masking; false alarm triggers upon cycling heating and air conditioning (HVAC) equipment; false alarm triggers upon radio frequency interference (cordless phones, microwave ovens, wireless networking) and false triggering upon large body disturbances (cars) behind exterior walls.

Intrusion motion detectors based upon the processing of video images could be used in such cases, but they are also subject to a number of challenges. In this regard, discriminating small animals (pets or pests) from humans; objects that sway in the wind (e.g., tree branches in a window, curtains); moving shadows, lights or abrupt changes in room lighting conditions can cause false alarms. With the above limitations in current practices noted, more reliable methods for detecting human intrusion threats are needed.

DETAILED DESCRIPTION OF AN ILLUSTRATED EMBODIMENT

Figure 1:
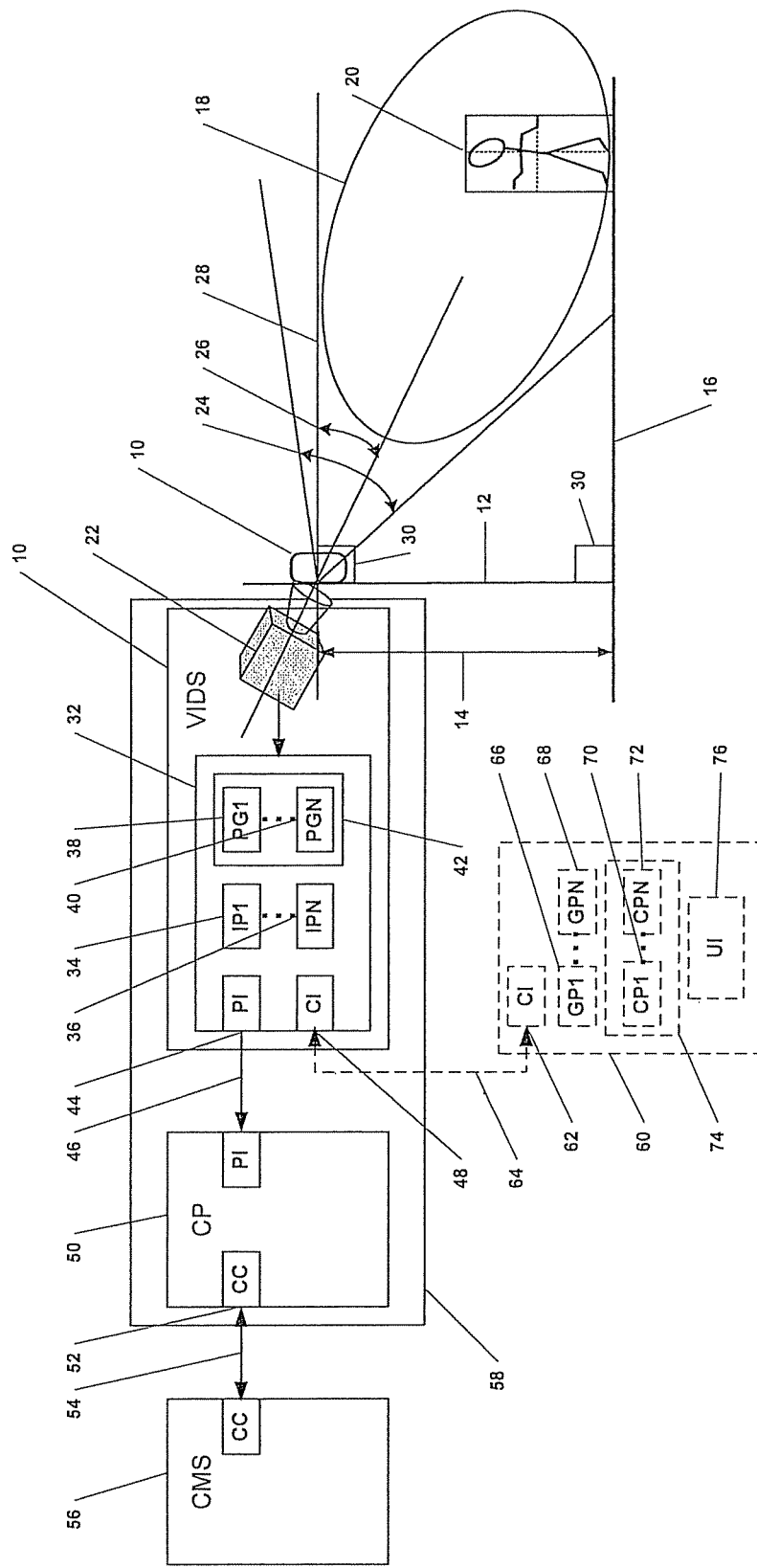
FIG. 1 is a block diagram of a video intrusion detection system in accordance with an illustrated embodiment.

FIG. 1 is a block diagram of a video intrusion detection system 10 shown generally in accordance with an illustrated embodiment. The embodied system 10 is typically mounted to a vertical wall surface 12 at a known nominal mounting height 14 overlooking the secured area 18 to detect the presence of human intruders 20.

Included within the system 10 is a video camera 22 and image processing unit 32. In this regard, the video camera 22 continuously captures images of a secured area 18.

Taking image sequences from camera 22, the image processing unit 32 processes those images to detect human intruders 20.

Once a determination is made of a human intrusion attempt by detecting a human 20 based upon operation of the video intrusion detection system 10, a signal of the attempt (e.g., a message) is passed to the alarm control panel 50 which collects all such similar sensor signals and applies logic to determine if a valid alarm condition is present within the secured area 16.

Upon the determination of an alarm condition, the alarm control panel 50 composes and sends an alarm signal to a central monitoring station 56. The central monitoring station 56, in turn, may summon the police.

Figure 3:
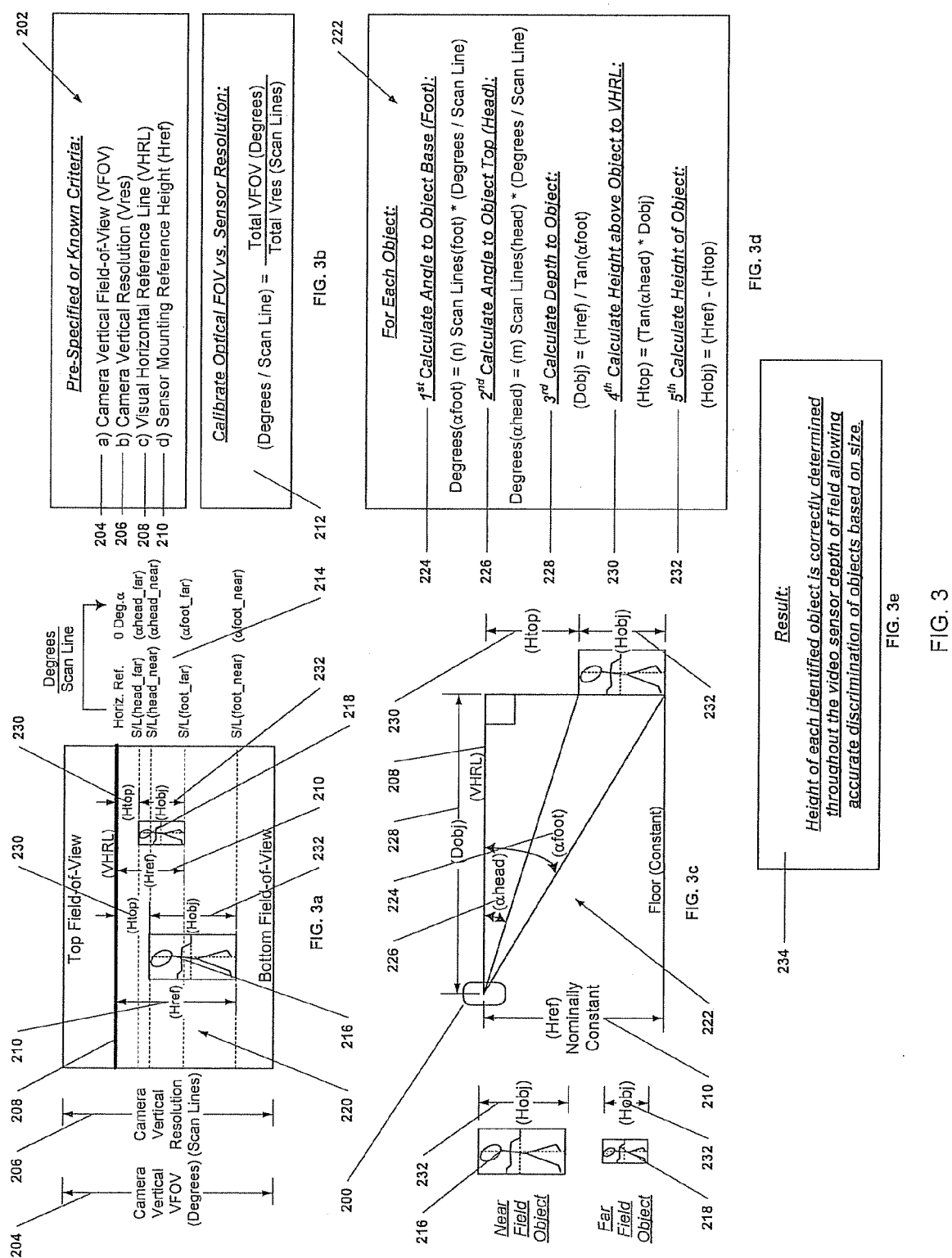
FIG. 3 is an explanation of the method employed for object size measurement and distance correction by the system of FIG. 1.

The depicted embodiment of system 10 relies upon a set of geometrical characteristics regarding how the device is constructed and generally applied in the field which operate in conjunction to help accurately determine object size as shown in FIG. 3. These geometrical characteristics include:
  a) The camera 22 having an optical field of view 24.
  b) The camera 22 having a mounting angle 26 relative to the vertical mounting wall surface 12 and horizontal reference line 28.
  c) The camera 22 having a known nominal mounting height 14 above the floor 16.
  d) The camera 22 having a vertical mounting wall surface 12 that is at a nominal ninety degree right angle 30 to the floor 16 and to a horizontal reference line 28.
  e) The camera 22 having a known visual horizontal reference line 28 that is held at a constant height above the floor equal to mounting height 14.

While the mounted height 14 is assumed to be a common nominal value as practiced in the security field (e.g., 7½ feet), provisions may be made to program a different mounting height value for non-standard applications.

Within the image processing unit 32 there may be one or more image processors 34, 36 programmed with one or more computer programs (software) 38, 40 loaded from a non-transitory computer readable medium (memory) 42. The image processors 34, 36 sequentially receive video frames from the camera 22 in real time. The programmed image processors 34, 36 first detect and then extract moving objects. The extracted objects in motion are then processed to assess threat potential by performing a comparison of detected object(s) to internally stored human form and motion signatures resident within computer program elements 38 and 40.

A signal from video intrusion detection system 10 indicating a human intrusion event is communicated to the alarm control panel 50 by the panel interface 44 over a panel communication medium 46. The panel interface and panel communication medium can be wired (e.g. dry contact closure or serial bus) or wireless (e.g. short range radio) in nature.

The alarm control panel 50 in turn communicates an alarm message to the central monitoring station 56 by the communication channel interface 52 and communication channel medium 54. The communication interface and medium can be a wired terrestrial line (e.g. telephone or internet service) or wireless (e.g. cellular radio) in nature.

Adjustments of the video intrusion detection system 10 can be made by means of a mobile computing device (e.g., a computer) 60 having a computer interface 62 communicating with the video intrusion detection system 10 over a computer communication medium 64. A computer interface 48 within system 10 provides the means for accepting programming information from the mobile computing device 60. The computer interface medium and supporting interfaces 48 and 62 can be wired (e.g. USB, Ethernet) or short range wireless devices (e.g., WiFi, Bluetooth).

The process of making adjustments to the video intrusion detection system 10 are controlled by a User Interface 300 and one or more Configuration Program elements 70 and 72 loaded on a non-transitory memory 74 running on one or more general purpose processors 66 and 68 within the mobile computing device 60.

Figure 4:
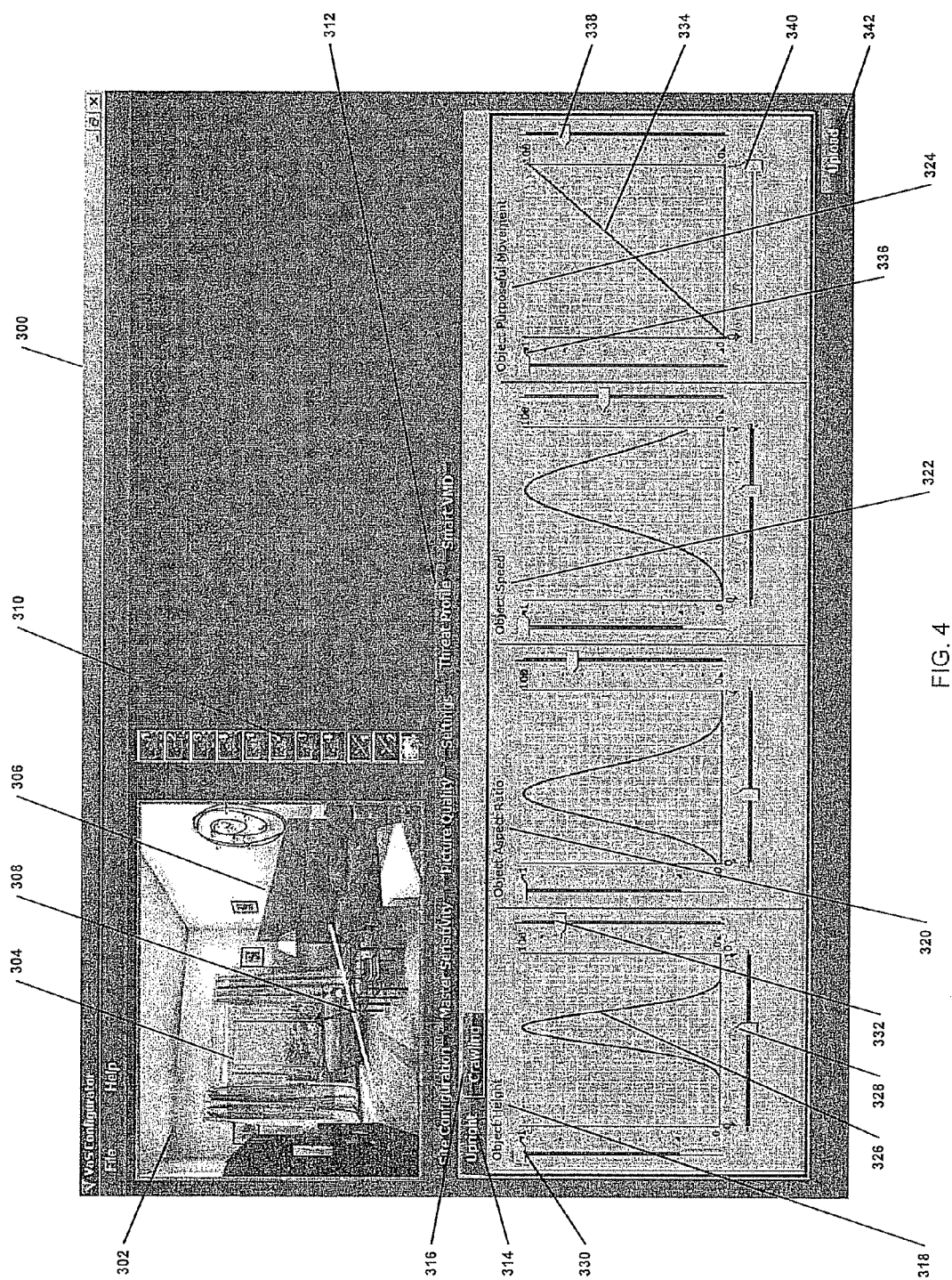
FIG. 4 depicts a control program user interface method which may optionally be used to adjust operation of the system of FIG. 1.

The mobile computing device 60 contains a user interface display 76 which presents a control screen to the operator as shown in FIG. 4.

The mobile computing device 60 is not required to successfully operate the video intrusion detection system 10 as the system is intended to operate with nominal pre-determined parameters set (or otherwise entered) during manufacture. The mobile computing device 60 and associated Configuration Program 70 and 72 is only required to adjust system 10 detection parameters for a particular security environment or activities that may lay outside default norms thus allowing one motion sensor device to operate within a wide range of physical security scenarios.

The preferred embodiment in FIG. 1 shows the camera 22 and image processing unit 32 are co-located within system 10 which in turn communicates detected human motion events to a physically separate alarm control panel 50.

An alternate embodiment is possible where the video intrusion detection system 10 and alarm control panel 50 are optionally co-located within a common housing 58.

Another embodiment may exist where camera 22 is physically separate from the image processing unit 32. In addition, the image processing unit 32 may co-reside with the alarm control panel 50 or may exist as a separate entity.

Another embodiment of system 10 may have a plurality of cameras 22 providing images to a central image processing unit 32.

Another embodiment may not have the system 10 or camera 22 mounted to a vertical wall surface 14 at known height 12 but rather suspended from the ceiling at known height 12 by means of a ceiling mount apparatus.

Figure 2:
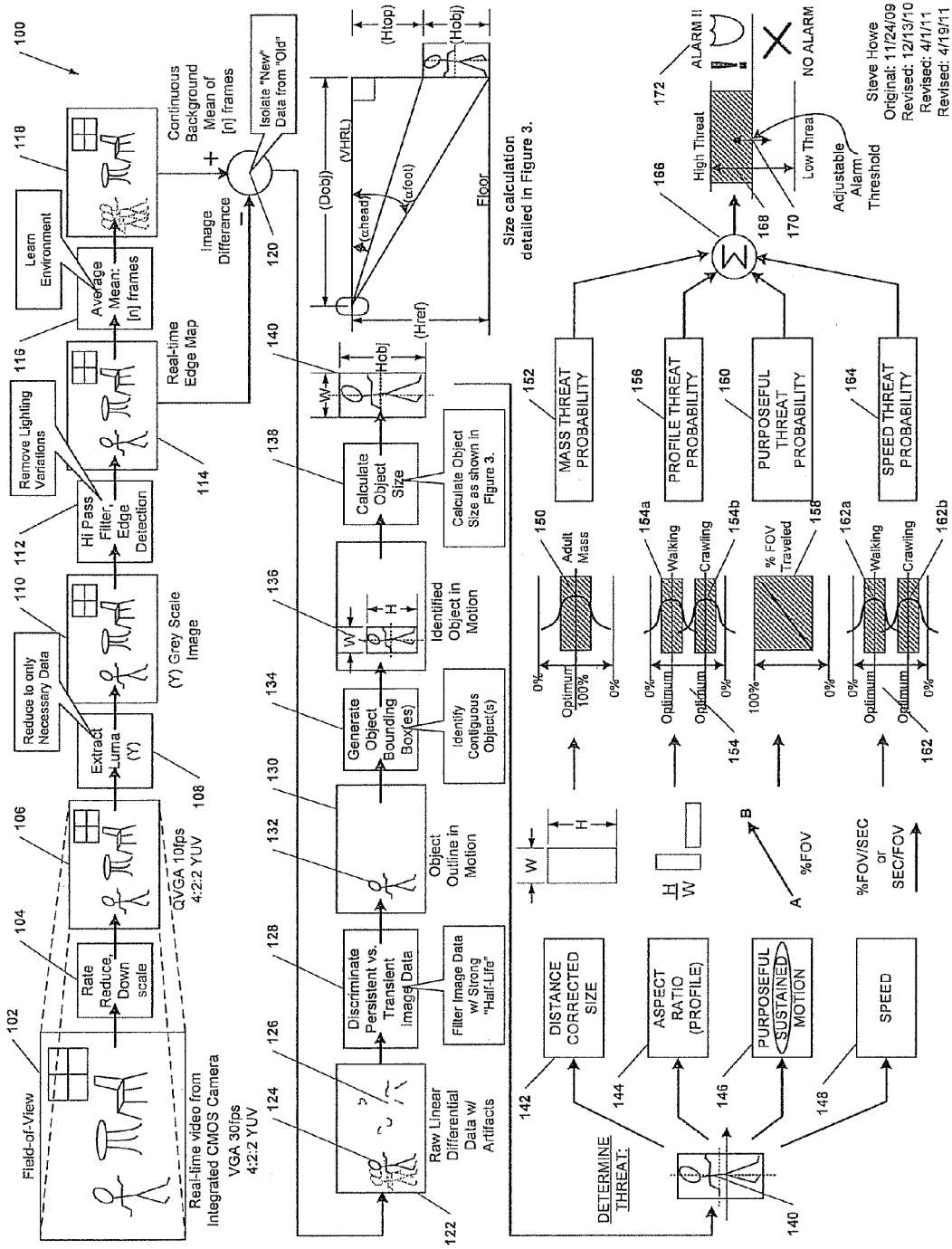
FIG. 2 is a flow chart of processing steps that may be performed by the system of FIG. 1.

FIG. 2 is a flow chart 100 of a set of processing steps that may be performed by the processors 34, 36 of image processing unit 32. It should be specifically noted that reference to step in FIG. 2 is also a reference to the respective programmed image processor 34, 36 that accomplishes that step.

It should also be noted that not all of the steps of FIG. 2 are necessary to achieve the practical benefits of the embodiments described herein. For example, to reduce the processing load, a sequence of real time video frames 102 may be received from the camera at VGA (640×480) resolution at 30 frames per second (fps) and may be downscaled and rate reduced 104 to QVGA resolution (320×240) at 10 fps 106. Similarly, color information may be removed 108 to generate a grey scale only image 110. In other embodiments, these processing steps may be eliminated to achieve a more precise result using the higher resolution, higher frame rate and color data.

Once the frames of video have been reduced to grey scale, a high-pass edge detection processor may be used remove ambient lighting variations 112 and in order to better define a set of tangible objects within the sequence of frames. The result is a real time edge map 114.

The image processing unit 32 may then operate to learn the background environment of the secured area 18 viewed by the camera 22 by averaging 116 the pixels at each location within the sequence of images in order to generate a background image 118. The background image, in effect, defines the stationary background within the secured area 18.

The real time edge map 114 may then be subtracted 120 on a pixel-by-pixel basis from the background image edge map 118. The result is a real time set of image outlines 122 that includes only the moving object 124 within the stream of images and unwanted residual image artifacts 126 left from the subtraction process 120.

Subsequently, moving objects 124 together with artifacts 126 are filtered 128 to remove the transient artifact pixel data 126. This artifact filtering may be based on only preserving or thresholding image pixel data with a strong pixel value half-life (i.e., data persistence) after the iterative foreground/background subtraction process 120. The results are defined by image outlines 130 that contain only well defined moving objects 132.

A bounding box 136 may then be automatically created 134 around each moving object outline 132. The object bounding box 136 is defined by the object height (from head to foot) and object width (left to right edge). This rectangular bounding box 136 around the moving object 132 will be used for further human proportion and motion discrimination.

The size (mass) of the moving object 132 may then be calculated 138 based upon the size of the bounding box 136, its position in the camera 22 field of view 24 and a set of geometrical assumptions 202 about how the system 10 is applied. This object size calculation method 200 is shown in FIG. 3.

FIGS. 3a and 3b. show the geometrical and spatial reference information 202 that is known or pre-specified either during manufacture or by nature of installation which is provided for establishing accurate object size. This information includes:

a) Camera Vertical Field of View in Degrees (VFOV) 204
  b) Camera Vertical Resolution in Scan Lines (Vres) 206
  c) Visual Horizontal Reference Line (VHRL) 208
  d) System 10 Mounting Reference Height (Href) 210

By having known Camera Vertical Field of View (VFOV) 204 and Camera Vertical Resolution (Vres) 206, a scan line to angular Calibration Factor 212 can be derived by dividing Vertical Field of View (VFOV) 204 by Vertical Resolution (Vres) 206 to get a degrees per scan line conversion. This provides the angular translation 214 necessary for subsequent trigometric object size measurement 222. This translation calculation need only be done once during device manufacture and programming.

The Visual Horizontal Reference Line (VHRL) marks the scan line position within the camera field of view 220 which indicates the virtual horizontal reference plane that runs parallel to the floor 16 at the mounted height 14 and extends out at a ninety degree right angle from the vertical plane (e.g., the mounting wall surface) 12. The VHRL 208 is pre-determined by the physical design and mounting orientation of camera 22 with respect to the wall mounting surface 12.

Another embodiment of system 10 with camera 22 can physically fix the mounting position of camera 22 such that the top of field of view is coincident with the VHRL 208 to maximize vertical field of view 204 coverage over the protected area 18.

The Mounting Reference Height (Href) 210 is the internally programmed numerical value of system mounting height 14. Href 210 will normally assume a nominal default value of 7½ feet high from the floor which is the industry norm for mounting motion sensors on a wall within a room which has a standard 8 foot ceiling. For non-standard mounting scenarios, Href 210 can be programmed in the field to be another mounting height value.

FIG. 3a and FIG. 3c give an example of a detected near field object 216 and a far field object 218 within the field of view 220. FIGS. 3b and 3c depict a set of steps performed by image processors 34, 36 to correct the image size (mass) for optical depth perception distortion based upon distance from the security camera. In this regard, a consistent means of determining object height and size is needed regardless of an object position within the field of view 220 and the optical depth perception distortion that is present. FIG. 3d outlines the calculation process 222 employed to solve the optical depth perception distortion problem.

FIG. 3d shows that for any detected object (near field or far field) within a captured frame, a five step size calculation process 222 is performed at each video frame sample. These object size calculation steps include:

a) Calculate Angle to Object Base (αfoot) 224 in degrees. The angle in degrees to the object foot (αfoot) is equal to the number of scan lines from the VHRL 208 to the object foot multiplied by the angular calibration factor 212 (degrees/scan line).

b) Calculate Angle to Object Top (ahead) 226 in degrees. The angle in degrees to the object head (ahead) is equal to the number of scan lines from the VHRL 208 to the object head multiplied by the angular calibration factor 212 (degrees/scan line).

c) Calculate Depth to Object (Dobj) 228. The Depth to Object (Dobj) 228 is equal to the mounting reference height (Href) divided by the Tangent of (αfoot) 224.

d) Calculate Height above Object (Htop) to VHRL 230. The height above an object (Htop) is equal to Tangent of (ahead) 226 multiplied by the depth to the object 228.

e) Calculate Height of Object 232. The height of the object (Hobj) 232 is equal to the mounting reference height 210 minus the height above the object (Htop) 230.

FIG. 3e summarizes the calculation result 234 in which the video intrusion detection system 10 and in particular the image processing unit 32, by employing above described and embodied trigometric calculations 222, provide the ability to correctly determine the height of each identified moving object (Hobj) 232 throughout the video sensor depth of field in a consistent and reasonably accurate manner. With the actual height (and size) of an object correctly determined, the system 10 is now able to further employ rule sets to determine the degree of threat of the detected object in motion.

FIG. 2 shows identified object of correctly determined size with bounding box 140 which is now ready for further threat analysis. Each identified object with bounding box 140 is assessed for human motion threat potential by employing four specific threat signature filters which compares object 140 in real-time to signatures that are of known human threat profiles 142, 144, 146, 148. These threat filters operate concurrently and in parallel to output a weighted linear threat value 152, 156, 160, 164 for that particular threat signature potential. These object threat filters include:

a) Object Size (or Height) 142 typically expressed in feet or meters.

b) Object Profile/Aspect Ratio 144 typically expressed as a height numerator over a width denominator.

c) Object Purposeful/Sustained Motion 146 typically expressed as amount of direct travel (non-oscillatory, non-wandering) percentage within the field of view over time.

d) Object Speed 148 typically expressed in percentage of field of view travel per second or seconds per field of view traveled.

The selection of criteria: Object Size 142, Object Profile 144, Object Purposeful Motion 146 and Object Speed 148 are chosen to allow the system embodiment 10 to have reasonable low cost processing hardware requirements while still achieving the objectives of human motion discrimination.

In other possible embodiments of the system 10, physical human body shape (ex: head, torso limbs), stride and gait signature criteria may also be included to be part of a more comprehensive threat signature analysis method at the expense of higher computational requirements and additional development and testing effort.

From the identified object bounding box 140, object height information 142 is compared to a bell shaped height distribution curve 150 which maps the natural distribution of height found in adult humans. The curve mean or center represents the average adult height and the standard of deviation or side lobe distribution governs the selectiveness or inclusiveness of object height information that may fall outside the optimum adult height mean. The intersection or comparison of Object Size 142 with the height distribution curve 150 will result in a linear Size Threat Probability 152 output value. This output value will contribute to the overall object threat potential 168 along with other voting peers. The object size curve 150 shape characteristics (mean and standard of deviation) are field programmable by means of the optional Configuration Program 70, 72 allowing the default optimum adult size curve characteristics to be altered to better match particular human target types or regional or societal differences in body shape.

From the identified object bounding box 140, Object Aspect Ratio or Object Profile information 144 is obtained by dividing the object height by the object width. Extracted Object Profile 144 is then compared to a bell shaped aspect ratio curve 154 which maps the natural distribution of the nominal aspect ratio found in upright adult humans 154a or humans in a crawling position 154b. The curve mean or center represents the average upright adult aspect ratio and the standard of deviation or side lobe distribution governs the selectiveness or inclusiveness of sampled object aspect ratios that may fall outside the optimum adult aspect ratio mean. The intersection or comparison of object aspect ratio 144 with the aspect ratio distribution curve 154a or 154b produces a resulting Object Profile Threat Probability 156 output value. This Object Profile or aspect ratio output value 156 will contribute to the overall object threat potential 168 along with other voting peers. The Object Profile or aspect ratio curve 154a and 154b shape characteristics (i.e., mean and standard of deviation) are field programmable by means of the optional Configuration Program 70, 72 allowing the default optimum adult profile curve 154 to be altered to better match particular human target types or regional or societal differences in body shape.

From the identified object bounding box 140, Object Purposeful Sustained Motion information 146 is obtained by sampling and tracking the frame by frame position (motion path) of the object box 140 center over time with respect to the object's straight line motion starting and ending points. Extracted Object Purposeful/Sustained Motion 146 then is mapped onto a linear purposeful motion ramp function 158.

The intersection or comparison of Object Purposeful/Sustained Motion 146 with the Purposeful Motion linear ramp function 158 will result in an Object Purposeful Motion Threat Probability 160 output value. Specifically stated: More direct line intentional object travel will yield a higher object threat probability, more oscillatory or wandering object motion will yield less threat potential being output. This Object Purposeful Motion Threat Probability 160 value will contribute to the overall object threat potential 168 along with other voting peers. The Purposeful Sustained Motion Threat ramp function characteristics 158 are field programmable by means of the optional Configuration Program 70, 72 allowing user to re-define the default Purposeful Sustained Motion Threat ramp function 158 to affect greater or less sensitivity to an object's motion path which may be less than a straight line and more of a oscillatory or wandering nature.

From the identified object bounding box 140, Object Speed information 148 is obtained by sampling frame by frame progress with respect to time of the object box 140 center position. Extracted Object Speed information 148 is then compared to a bell shaped Object Speed curve 162 which maps the natural distribution of an upright human walking speed 162a or a crawling human speed 162b. The curve mean or center represents the average adult walking 162a or crawling 162b speed and the standard of deviation or side lobe distribution governs the selectiveness or inclusiveness of the tracked object speed that may fall outside the optimum human walking or crawling speed mean. The intersection or comparison of Object Speed 148 with the object speed distribution curve 162a or 162b will result in an Object Speed Threat Probability 164 output value. This Object Speed Probability output value 164 will contribute to the overall object threat potential 168 along with other voting peers. The Object Speed curve 154a and 154b shape characteristics (mean and standard of deviation) are field programmable by means of the optional Configuration Program 70, 72 allowing the default optimum adult walking speed 162a or crawling speed to be altered to better match particular target types or security conditions.

Object Size Threat Probability 152, Object Profile Threat Probability 156, Purposeful Motion Threat Probability 160 and Object Speed Threat Probability 164 are peer voting analysis functions which contribute their respective threat assessment value to an overall threat probability summing calculation 166. The resulting Master Threat Probability value 168 represents the likelihood of a human motion threat within the protected area 18.

Master Threat Probability value 168 is then compared to a programmable Master Threat Sensitivity Threshold reference 170. A Master Threat Probability value 168 which is greater than the Master Threat Sensitivity Threshold 170 will cause a Motion Alarm Output 172 to be generated through the Panel Interface 44 to the Alarm Control Panel 50 indicating that detected activity within the protected area 18 is of sufficient probability of human motion threat to warrant an alarm 172 to be generated by system 10. A Master Threat Probability value 168 which is less than the Master Threat Sensitivity Threshold 170 will not cause a Motion Alarm Output to be generated as the criteria for initiating such an alarm did not rise to the level to be determined a human motion threat by system 10.

Under this particular embodiment and upon determining that the overall threat value is above the threshold 170, the alarm panel 50 may generate and send an alarm message to the central monitoring station 56.

Under another embodiment, when the overall threat value exceeds the threshold 170, a local alarm may sound thereby notifying local security personnel of the threat. The local security personnel may then react by directly monitoring the video from the camera 22 in order to take more direct action.

FIG. 4. illustrates one particular embodiment, of many possible embodiments, including a user interface 300 which may be provided through software 70, 72 running on mobile computing device 60 and presented on its display 76.

The purpose of the user interface 300 is primarily two fold: Define sensitive or non-sensitive regions within the protected area and to make object sensitivity adjustments to the video intrusion detection system 10.

It is important to reiterate that in the preferred embodiment, the user interface 300 and supporting software 70, 72 are optional and not required for operation of system 10 as the device will assume factory default programming in the absence of further user interaction. However, in another possible embodiment, the user interface 300 may be included as a standard option and as part of an overall video motion and intrusion detection and management system solution.

Should alarm sensitive regions need to be reconfigured on-site, a live video viewing window 302 is presented which shows the user (alarm installer) an image of what the video motion sensor camera 22 "sees". The user has the ability to define multiple Regions-of-Interest (ROI) 304, Regions-of-No-Interest (RONI) 306, or Direction Sensitive Trip-Wires or Virtual Fence Lines 308 which are superimposed over the live video image 302 of the protected area 18. A graphical icon selection menu of ROI, RONI and Trip Wires 310 is available next to the live video window 302 to allow the user to select, place and size these regions over the image of the observed area to meet particular site requirements.

The Region-of-Interest (ROI) 304 is a user definable polygon which delineates a motion sensitive region or inclusion zone within the observed area. Qualified moving objects within the defined area will generate a motion alert. Qualified moving objects outside the defined area will not generate a motion alert. The user interface 300 will present this ROI 304 polygon in a translucent manner to allow viewing the scene area underneath the polygon. One or more ROI regions 304 can be placed and defined anywhere within the observed area by selecting from the icon menu bar 310.

The factory default "out-of-box" operation (that is operation without further user interaction or programming) of system 10 is such that the entire Field-of-View 24 assumes Region-of-Interest (ROI) status making the entire observed area sensitive to qualified motion events.

The Region-of-No-Interest (RONI) 306 is a user definable polygon which delineates a "don't care" region or exclusion zone within the observed area 18. Qualified moving objects within the defined area will not generate a motion alert. This is useful for filtering out potentially troublesome motion that may be outside the control of the alarm installer or occupants present (such as objects outside a window or doorway). The user interface 300 will present this RONI 306 polygon in a translucent manner to allow viewing the scene area underneath the polygon. One or more RONI 306 regions can be placed and defined anywhere within the observed area by selecting from the icon menu bar 310.

The Trip Wire or Virtual Fence 308 is a user definable line segment which places a motion trigger line anywhere within the observed area. The Trip Wire 308 is direction sensitive such that a qualified moving object, traveling across the Trip Wire 308 in the sensitive direction will issue a motion alert. A qualified moving object traveling across the Trip Wire 308 in the non-sensitive direction will not issue a motion alert. The user interface 300 allows the user (installer) to set direction sensitivity by selecting the direction arrow attached to the Trip Wire 308 to flip or reverse the current direction of sensitive travel. One or more Trip Wires 308 can be placed and defined by selecting the appropriate icon from the icon menu bar 310.

To affect in-field user adjustments to object sensitivity of system 10, the user interface 300 presents a series of menu "tabs" arranged by function. These functional tabs allow user reconfiguration of how system 10: is installed (determining mounting height 14, 210), defines Master Sensitivity level 170, optimizes camera operation and defines "Threat Profile" settings 318, 320, 322, 324 governing how internal threat filters 150,154,158,162 discriminate moving human forms from other potential moving objects.

The "Threat Profile" function tab 312 is a key focal point on how object detection and filtering rules of system 10 can be shaped and tailored to be more or less selective to certain human object forms (e.g., children vs. adults) or to better discriminate between large pets or pests and humans (e.g., pet immunity) or filter out oscillatory or spurious environmental motion (e.g., curtains or leaves in the wind).

The Threat Profile tab 312 is sub-divided into an "Upright" tab 314 defining upright human forms in motion and a "Crawling" tab 316 defining possible crawling human forms in motion. The look, feel and operation of the two threat profile tabs are very similar allowing theory of operation for the Upright tab 314 to serve as well for the Crawling tab 316, as will be described herein.

In this regard, a set of interactive graphic windows 318, 320, 322, 324 are provided to allow the user (installer) to shape and characterize the object threat filter profiles as referenced in FIG. 2 and where the operation is described previously herein. In review, these threat signature profiles and filter functions are: Object Size (height) 142, Object Profile/Aspect Ratio 144, Object Speed 148 and Object Purposeful/Sustained Motion 146.

For example, the Object Size/Height graphic control window 318 shows a set of slider controls 328, 330, 332 adjacent the object height bell curve 326 representing the average natural height distribution of upright human forms. Re-shaping and re-characterizing the object height bell curve 326 (as well as other bell curve functions 320, 322) and resulting output contribution is done by moving the respective curve manipulation slider controls in the manner described below.

To manipulate the statistical bell curve distribution slope across its side lobes (or standard of deviation), the left hand slide control 330 is used. The net effect is to broaden inclusiveness (slider upward) or to narrow selectivity (slider downward) of the object height bell curve 326 as it is used to map incoming object size/height data. Other graphical relationship methods may also be employed.

To manipulate the statistical bell curve center (or mean) value, the bottom slide control 328 is used. The net effect is to reposition the optimum object height reference point to a smaller mean value (slider left) or larger mean value (slider right). Other graphical relationship methods may also be employed.

To manipulate the output contribution of that particular object signature mapping function, the right hand slide control 332 is used. The net effect is to increase weighted contribution (slider upward) or decrease weighted contribution (slider downward) to the overall threat probability calculation 166. Other graphical relationship methods may also be employed.

The general slider control manipulation methods for standard of deviation, mean and output contribution 328, 330, 332 described above for Object Height function 318 equally apply for the remaining bell curve filter functions: Object Aspect Ratio 320 and Object Speed 322.

The Object Purposeful Travel graphic control window 324 represents a linear ramp function where greater linear object travel over time will represent a greater threat potential of the object in question. In as such, the slope transfer function is governed by the left hand slider control 336. The output contribution of the ramp function to the overall threat probability calculation is governed by the right hand slider control 338. A curve centering adjustment is not relevant to the motion ramp function thus causing that non-functional adjustment to be deleted or "grayed out" 340. In another possible embodiment, the ramp slope control and output control may be combined into a single adjustment.

An Upload button 342 may be presented to the user to affect and confirm adjustments to system 10 made through the user interface 300. In other possible embodiments of user interface 300, an Upload button 342 may not be present where by any adjustments made to system 10 may be affected in a continuous and automatic manner transparent to the user.

What now is achieved in the broader sense by presenting controls 318, 320, 322, 324 to the user (installer) is to allow specific manipulation and recharacterizing of the object detection filters 150, 154, 158, 162 governing how system 10 determines, with a high degree of reliability, a potential moving human threat 20, 140 from other moving objects within the protected area 18.

In addition to the features described above, the processing unit 32 may also include one or more processors 34, 36 to define ROI inclusion (keep out) areas, RONI exclusion (don't care) areas and/or trip wires (virtual fences). In this regard, moving objects 20, 140 detected in an RONI exclusion area would still be tracked but would not qualify for a motion alert until the object departed from the RONI exclusion zone. If a moving object were being tracked before entering the RONI exclusion zone, then tracking would continue through the exclusion zone, until departing again where it may become qualified to generate a motion alert. In ROI keep out areas, an alarm may be generated 172 when qualifying object threat criteria exceed the programmable master threat threshold value 170. Similarly, direction sensitive trip wires or virtual fences may be used to define exclusion or inclusion areas in which the actual egress or ingress direction is of critical importance to maintaining safety and security of an observed area.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method of detecting human motion comprising:
a camera collecting video images of a secured area;
extracting objects in motion from the collected images;
for each extracted object determining an object size;
correcting the object size for optical depth perception distortion based upon known or derived geometrical and optical information;
for each extracted object determining, an object size, an object aspect ratio, an object speed and object motion path over time;
extracted a signature for each extracted object by comparing the distance corrected object size with a bell curve tuned to a statistical average of human size, the object aspect ratio based upon a pair of bell curves tuned to a statistical average of aspect ratios of human proportions including one for walking and one for crawling, the object speed with a pair of bell curves tuned to a statistical average of travel speeds of a typical human including one for walking and one for crawling and object motion path travel as measured against absolute distance traveled over time;

determining a respective threat probability for each of the extracted object signatures based upon the corrected object size compared with the bell curve tuned to human size, the aspect ratio compared with the bell curves tuned to both walking and crawling, the object speed compared with the bell curves for walking and crawling and upon a time of sustained object direction of travel;

summing the respective threat probabilities for each extracted object signature based upon size, aspect ratio, speed and time of sustained travel; and generating a motion alert upon detecting the summed human motion threat probabilities exceeding a programmable threshold value.

2. The method of detecting human motion as in claim 1 wherein the step of correcting for optical depth perception distortion further comprises determining actual and correct distance and height of the extracted object from the camera based upon known or derived geometrical and optical information as mounting height of the camera, optical field of view of the camera, vertical resolution of the camera, mounted angle of the camera relative to camera mounting surface and a horizontal reference parallel to floor and ceiling.

3. The method of detecting human motion as in claim 2 wherein the step of correcting for optical depth perception distortion further comprises the steps in determining actual and correct object distance and height by the calculation sequence of: camera viewing angle to foot of object, camera viewing angle to head of object, depth to object by the mounting height divided by the tangent of angle to foot, height above object by the tangent of angle to head as multiplied by depth of object and height of object by the difference of camera mounting height and height above object.

4. The method of detecting human motion as in claim 2 wherein the step of correcting for optical depth perception distortion further comprises determining actual and correct vertical and horizontal size of the extracted object by knowing or deriving: mounting height of the camera, optical field of view of the camera, vertical resolution of the camera, mounted angle of the camera relative to camera mounting surface, a horizontal reference parallel to floor and ceiling and by the calculation sequence of camera viewing angle to foot of object, camera viewing angle to head of object, depth to object by the mounting height divided by the tangent of angle to foot, height above object by the tangent of angle to head as multiplied by depth of object and height of object by the difference of camera mounting height and height above object, determining vertical size equal to object height and horizontal size equal to object height divided by aspect ratio.

5. The method of detecting human motion as in claim 1 wherein the step of determining object threat potential based upon object size further comprises comparing the actual and correct size of a moving object in question with a bell curve tuned to a statistical average of human size, the result of such comparison yielding a linear threat calculation value in direct proportion to nominal human size.

6. The method of detecting human motion as in claim 1 wherein the step of determining object threat potential based upon object aspect ratio further comprises comparing the aspect ratio of a moving object in question with a pair of bell curves tuned to the statistical average of aspect ratios of the human form including one for upright and one for crawling, the result of such comparison yielding a linear threat calculation value in direct proportion to nominal human aspect ratio, as set by the observed moving object orientation.

7. The method of detecting human motion as in claim 1 wherein the step of determining object threat potential based upon object speed further comprises comparing the speed of a moving object in question with a pair of bell curves tuned to the statistical average travel speed of the humans including one for walking and one for crawling, the result of such comparison yielding a linear threat calculation value in direct proportion to nominal human travel speed, as set by the observed moving object orientation.

8. The method of detecting human motion as in claim 1 wherein the step of determining object threat potential based upon object purposeful/intentional travel further comprises tracking and comparing the motion path over time of a moving object in question with a linear ramp function mapping threat potential to absolute distance traveled over time, the result of such comparison yielding a linear threat calculation value in direct proportion to sustained directional movement over time and inversely proportional to oscillatory or wandering movement over time.

9. The method of detecting human motion as in claim 1 wherein the step of determining the respective threat probability for the extracted objects based upon the measurement of object size measured against the bell curve tuned to the statistical average of human size, the extracted object aspect ratio measured against the bell curves tuned to both walking and crawling, the extracted object speed measured against the bell curves for walking and crawling and upon extracted object motion path measured against absolute distance traveled over time; weighting and summing the respective threat probabilities based upon extracted object signature data obtained within the deployed environment.

10. The method of detecting human motion as in claim 1 wherein the step of determining the overall human motion threat potential of an extracted moving object within a secured area is based upon the combined aggregate summation of a plurality of video camera derived object signature extraction and analysis functions which together build an overall linear threat potential value of the identified object in question.

11. The method of detecting human motion as in claim 1 wherein the step of making an absolute and unqualified determination of a human motion event within the secured area is based upon the comparison of the collective summed linear threat potential value as determined by a plurality of video object signature and analysis functions of the moving object in question with a programmable threshold value, the result of which generates a simple motion/no-motion event signal to a decision making control panel.

12. A system detecting human motion comprising:
a camera that collects video images of a secured area;
a programmed processor that extracts objects in motion from the collected images;
a processor that determines an object size;
a processor that corrects the object size for optical depth perception distortion based upon known or derived geometrical and optical information;
a processor that measures a signature for each extracted object by comparing a distance corrected object size against a bell curve tuned to a statistical average of human size, an object aspect ratio against an a pair of bell curves tuned to a statistical average of aspect ratios of human proportions including one for walking and one for crawling; an object speed against a pair of bell curves tuned to a statistical average of travel speeds of a typical human including one for walking and one for crawling and object motion path travel as measured against absolute distance traveled over time;

a processor that determines a respective threat probability for each of the extracted object signatures based upon the measurement of object size against the bell curve tuned to human size, the aspect ratio against the bell curves tuned to both walking and crawling, the object speed against the bell curves for walking and crawling and upon a time of sustained direction of travel;

a processor that sums the respective threat probabilities for each extracted object based upon size, aspect ratio, speed and time of sustained travel; and a processor that generates a motion alert upon detecting that the summed human motion threat probabilities exceed a programmable threshold value.

13. The system as in claim 12 wherein the processor that corrects for optical depth perception distortion further comprises a processor that determines actual and correct distance and height of the extracted object from the camera based upon known or derived geometrical and optical information as mounting height of the camera, optical field of view of the camera, vertical resolution of the camera, mounted angle of the camera relative to camera mounting surface and a horizontal reference parallel to floor and ceiling.

14. The system as in claim 13 wherein the processor corrects for optical depth perception distortion further comprises a processor that determines actual and correct object distance and height by the calculation sequence of: camera viewing angle to foot of object, camera viewing angle to head of object, depth to object by the mounting height divided by the tangent of angle to foot, height above object by the tangent of angle to head as multiplied by depth of object and height of object by the difference of camera mounting height and height above object.

15. The system as in claim 13 wherein the processor corrects for optical depth perception distortion further comprises a processor that determines actual and correct vertical and horizontal size of the extracted object by knowing or deriving: mounting height of the camera, optical field of view of the camera, vertical resolution of the camera, mounted angle of the camera relative to camera mounting surface, a horizontal reference parallel to floor and ceiling and by the calculation sequence of camera viewing angle to foot of object, camera viewing angle to head of object, depth to object by the mounting height divided by tangent of angle to foot, height above object by tangent of angle to head as multiplied by depth of object and height of object by the difference of camera mounting height and height above object, determining vertical size equal to object height and horizontal size equal to object height divided by aspect ratio.

16. A system as in claim 12 wherein the processor that determines threat potential based upon object size further comprises a processor that compares the actual and correct size of a moving object in question with a bell curve tuned to a statistical average of human size, the result of such comparison yields a linear threat calculation value in direct proportion to nominal human size.

17. A system as in claim 12 wherein the processor that determines threat potential based upon object size further comprises a processor that compares the aspect ratio of a moving object in question with a pair of bell curves tuned to the statistical average of aspect ratios of the human form including one for upright and one for crawling, the result of such comparison yields a linear threat calculation value in direct proportion to nominal human aspect ratio, as set by the observed moving object orientation.

18. A system as in claim 12 wherein the processor that determines threat potential based upon object size further comprises a processor that compares the speed of a moving object in question with a pair of bell curves tuned to the statistical average travel speed of the humans including one for walking and one for crawling, the result of such comparison yields a linear threat calculation value in direct proportion to nominal human travel speed, as set by the observed moving object orientation.

19. A system as in claim 12 wherein the processor that determines threat potential based upon object size further comprises a processor that determines object threat potential based upon object purposeful/intentional travel further comprising tracking and comparing the motion path over time of a moving object in question with a linear ramp function mapping threat potential to absolute distance traveled over time, the result of such comparison yields a linear threat calculation value in direct proportion to sustained directional movement over time and inversely proportional to oscillatory or wandering movement over time.

20. The system as in claim 12 wherein the processor that determines the respective threat probability for the extracted objects based upon the measurement of object size, the aspect ratio, the object speed against the bell curves for walking and upon a time of sustained direction of travel further comprises a processor that weights the respective threat probability based upon extracted object signature data obtained within the deployed environment.

21. The system as in claim 12 further comprising a processor that determines the overall human threat potential of an extracted moving object within a secured area based upon the combined aggregate summation of a plurality of video camera derived object signature extraction and analysis functions that together build an overall linear threat potential value of the identified object in question.

22. The system as in claim 12 further comprising a processor that makes an absolute and unqualified determination of a human motion event within the secured area based upon the comparison of the collective summation of linear threat potential values as determined by a multitude of video object signature and analysis functions of the moving object in question with a programmable threshold value, resulting in the generation of a simple motion/no-motion event signal to a decision making control panel.

* * * * *